United States Patent Office 2,961,594
Patented Nov. 22, 1960

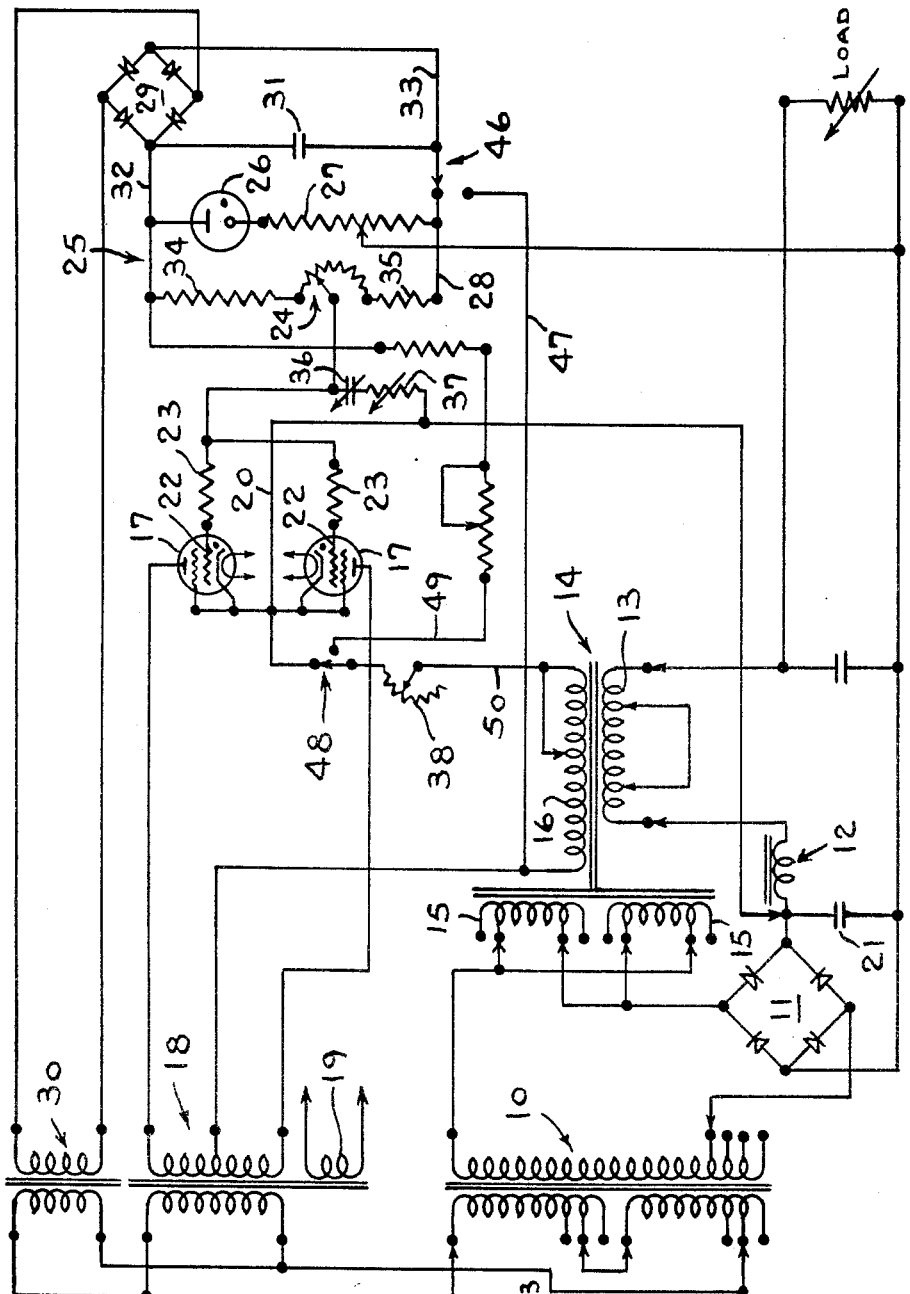
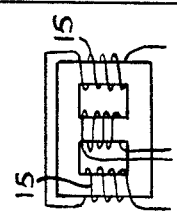
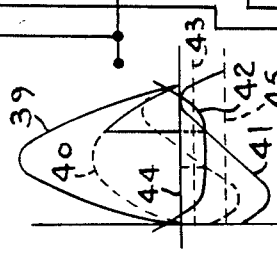

2,961,594

SYSTEM OF REGULATION

Henry G. Mah, Scarborough, Ontario, Canada, assignor to McGraw-Edison Company, Milwaukee, Wis., a corporation of Delaware Filed July 15, 1957, Ser. No. 672,012

11 Claims. (Cl. 321—19)

This invention relates to a system of regulation.

This invention is an improvement over that disclosed in my prior Patent No. 2,503,880, of April 11, 1950, for System of Regulation, and assigned to the same assignee as the present invention.

In general, this invention has the same objects as those set forth in my above noted patent, and in addition to that has other objects which constitute an improvement over those set forth in my above noted patent.

In my above noted patent a system of regulation was disclosed in which thyratrons were controlled from the load voltage, and in turn controlled a saturable reactor which controlled the supply of electrical energy to the load. Any variation in the load voltage was reflected by the thyratrons in a change in their control of the saturable reactor which in turn changed the energy supply for the D.C. load and thereby maintained a substantial constant voltage for the load.

This invention, however, has a further object from those set forth in the above noted patent. The additional object of this invention is to provide a system of control whereby either relatively large or small power delivered to the load is controlled in a very rapid and accurate manner so that minute and scarcely noticeable changes in voltage at the load are immediately corrected through the agency of a thyratron or thyratrons which in turn control a saturable reactor, and which are so arranged that the difference in a reference voltage and the load voltage, which may be referred to as the difference voltage, is used to control the saturable reactor as in the prior patent, but as differing from the prior disclosure by having a harmonic voltage wave superimposed on the difference voltage.

In the present invention a further object is to produce and so arrange the second harmonic voltage wave and to so associate it with the D.C. bias on the grids of the thyratrons that the control voltage wave cuts across, or intersects, the critical voltage characteristic curve of the thyratrons in a sharp or abrupt manner thereby allowing an extremely accurate control of the thyratrons.

In greater detail further objects are to provide a system of control in which a well filtered D.C. supply voltage is furnished the load and in which a saturable reactor controlled through thyratrons is furnished with a relatively large amount of energy or control power although the change in the load voltage may be very minute, and in which a very sharp firing point and cutoff are obtained due to the fact that a relatively large swing in the grid control voltage is produced by the superimposition of the second harmonic voltage wave on the D.C. bias of the grid of the thyratrons at the exact point desired.

Further objects are to provide a control system in which the controlling thyratrons, which in turn control a saturable reactor, are so arranged that the sharp cutoff hereinabove set forth is obtained although the system may be supplying a highly inductive load where there is normally a tendency for the current to hang on, so to speak, when it is desired to interrupt it or lessen it. Therefore, a still further object is to provide a means whereby the minimum current of the thyratron is controlled in a very accurate and highly delicate and sensitive manner whether the system supplies an inductive load or a resistance load.

A further object of this invention is to provide a system of control as hereinabove set forth in which a harmonic wave, for example, the second harmonic voltage wave produced by a full wave rectifier is used to supplement the negative D.C. bias which is superimposed on the grid of the thyratron, and in which means are provided for independently controlling the value or character of this second harmonic wave, as supplied the grid of the thyratrons so that any type of wave, that is to say of large or small amplitude, and of any desired shape or phase relation may be obtained by a simple adjustment.

An embodiment of the invention is shown in the accompanying drawings in which:

Figure 1 is a wiring diagram of the control system.

Figure 2 is a schematic diagram of the saturable reactor.

Figure 3 is a diagram showing the relation between the critical firing voltage and the control grid voltage and other characteristics of the thyratrons.

Referring to the drawings, particularly Figure 1, it will be seen that the apparatus comprises a main transformer 10 which supplies a direct current load through a full wave dry rectifier 11, and through a choke 12. In series with the load is the series D.C. coil 13 of a saturable reactor 14.

The saturable reactor has a pair of A.C. coils indicated by the reference character 15 and a second control D.C. coil 16. This second control D.C. coil 16 is supplied with direct current from a thyratron or from a pair of thyratrons 17 if full wave rectification is desired. Hereafter in the description, the thyratrons will be referred to in the plural although it is to be understood that a single thyratron could be employed if desired. The thyratrons are gas filled and are supplied from the secondary of the first auxiliary transformer 18 which is center tapped as indicated.

These thyratrons are gas filled, and their filaments are supplied from the auxiliary secondary 19 of the first auxiliary transformer 18. They may be provided with suppressor grids as shown in the drawings. Their cathodes and suppressor grids are connected together, and are connected to the conductor 20 which in turn is connected between the main rectifier 11 and the choke 12.

A condenser 21 is bridged across the load supply line at the inner side of the choke, or in other words, between the choke 12 and the main rectifier 11. The value of this condenser will be discussed hereinafter, as it is of significance in the operation of the apparatus.

It is to be noted that both of the D.C. control coils 13 and 16 are tapped so that any desired number of turns may be short circuited as desired. The purpose of this for coil 13 is to control the phase shift and amplitude of the saturation effect voltage hereinafter described, and the purpose of this for coil 16 is to control the phase shift and peak amplitude of the thyratron current.

The control grids 22 of the thyratrons are connected together, and each is provided with a resistor 23. They are supplied with direct current from the adjustable potentiometer 24 of a comparison circuit assembly. The comparison circuit assembly or comparison network is indicated generally by the reference character 25. It includes a voltage regulator tube 26 which is gas filled and which maintains a constant voltage between its cathode and anode in a well known manner. A resistor 27 is placed between the cathode of the voltage regulator tube 26 and the conductor 28.

An auxiliary rectifier 29 supplies the voltage regulator tube and is itself supplied or furnished with current from the second auxiliary transformer indicated by the reference character 30. This auxiliary rectifier is also a bridge type dry rectifier as indicated, although, of course, both the main and auxiliary rectifier may be of other designs if so desired.

A condenser 31 is connected between the conductors 32 and 33. The conductor 32 is connected to one of the direct current terminals of the auxiliary rectifier 29. The other direct current terminal of the auxiliary rectifier is connected to the conductor 33. As stated, the grids of the thyratrons 17 are connected to the potentiometer 24. The opposite terminals of the potentiometer are connected to the resistors 34 and 35 which are in turn connected to the conductors 32 and 28.

It is to be noted particularly that a variable or adjustable condenser 36 and an adjustable resistor or rheostat 37 are connected in series and are bridged across or connected in shunt between the cathodes and grids of the thyratrons 17.

It is to be noted also that there is a variable resistor or rheostat 38 connected in series between the common return from the cathodes of the thyratrons and the outer end of the control direct current coil 16 of the saturable reactor 14.

A particularly important point in the apparatus as hereinabove described, resides in the fact that the control of the thyratrons is extremely accurate, and the amplitude, the shape, and the phase relation of the control voltage supplied the grids of the thyratrons is adjustable to any desired value.

The value of the condenser 21 which is bridged between the load supply lines on the inner side of the choke 12 determines the amplitude of the second harmonic ripple.

It is to be noted that a further harmonic voltage is produced by the saturable reactor for it is apparent that the alternate saturation of the flux in the alternating current windings causes a resultant flux to induce a corresponding voltage in the two D.C. windings 13 and 16. The number of turns short circuited in the two D.C. windings 13 and 16 determine the phase shift and amplitude of the resultant induced voltage. This resultant induced current is used to balance out the residual thyratron conduction current hereinafter described.

The value of the adjustable condenser 36 and the adjustable resistor 37 determines the shape of the second harmonic ripple.

In the prior patented construction, when the correction takes palce, the D.C. voltage is moved closer to the desired voltage. Consequently, the D.C. output voltage from the rectifier has to change first in response to other changes, such as change in the input voltage, or changes in the load or other variables, and as a result of this, absolute correction is not possible.

In the invention herewith disclosed, these shortcomings are reduced, and the overall correction takes place from three origins or sources, namely, from line voltage changes, from load changes, and from output voltage changes resulting from all other variations, including the uncorrected residual of line voltage and load voltage changes.

It is to be noted that when the line voltage changes, for example when the line voltage increases, the drop across the voltage regulator tube 26 remains constant, and the resistor 27 has to absorb all of the change. On the other hand, the series arrangement of resistor 34, potentiometer 24, and resistor 35 absorbs jointly the changes due to the change in line voltage. Further, it is to be understood that the change in the value of the voltage at the tapped point on the resistor 27 changes more rapidly than that at the movable contact of the potentiometer 24. The voltage at the tapped point of the resistor 27 is usually set a few volts lower than the voltage at the movable contact of the potentiometer 24, so that the grids 22 of the thyratron 17 are negative. An increase in line voltage increases the voltage at both the tapped point of the resistor 27 and at the movable contact of the potentiometer 24, but the voltage at the tapped point increases more rapidly for increase in line voltage with the result that the grids 22 of the thyratron 17 become more negative with reference to the cathodes for an increase of line voltage due to the fact that the cathodes of the thyratrons become more positive. Consequently saturation of the saturable reactor 14 decreases, and the reactance effect of the saturable reactor 14 is therefore increased and a greater drop occurs across this saturable reactor, which therefore, tends to decrease the voltage impessed on the load. In this way the load voltage is maintained constant although the line voltage varies.

It has been found that the second harmonic or ripple voltage increases with the load. The ripple voltage of 120 cycle increases faster but proportionally with the load. It is possible, therefore, to have this increase in ripple voltage so used that the saturating control current can be adjusted to operate in any manner desired. For example, with increase in load, the ripple voltage increases, and consequently the thyratron current which saturates the saturable reactor increases. This allows a lesser drop to occur at the saturable reactor, and thus maintains constant voltage at the load. However, if it is desired to have a rising voltage characteristic with an increase in load, this can also be done by properly controlling the 120 cycle or second harmonic ripple wave. These controls can be obtained independently of any change in D.C. reference voltage, if so desired.

Further than this, it is to be noted that if it is desired, the following arrangement can be had, although the D.C. reference voltage may decrease, nevertheless, the current obtained through the thyratrons can be made to increase by properly using the ripple voltage. Other changes can be made, thereby obtaining great flexibility in the use of the second harmonic or ripple voltage wave.

The comparison portion of the circuit includes the auxiliary rectifier 29 and its associated network, and the voltage regulator tube 26 and the thyratrons 17 and the associated resistor network. This entire group of elements constitutes the comparison portion of the system. It is to be noted that all of these factors, acting jointly, control the current flowing through the coil 16 of the saturable reactor 14 and thereby control the saturation of this saturable reactor. The amount of saturation of the saturable reactor controls the current flowing to the load and consequently controls the voltage at the load.

Line voltage changes can be compensated for so that the D.C. output voltage can be corrected to the proper value by the action of the voltage comparison portion of the system as one feature of the invention. As a second feature of this invention D.C. load changes can be governed or their effect completely stopped. This correction is obtained by the use of the 120 cycle or second harmonic ripple wave.

The third correction is for controlling the D.C. output voltage and any remaining changes resulting from all other variations including the uncorrected residual effect of the line voltage and load voltage changes.

The shorted turns on the coil 16 of the saturable reactor are for the purpose of adjusting the effect of the coil 16 on the thyratron conduction of current. It is apparent that the more turns that are shorted in the coil 16 of the saturable reactor, the less inductance the coil will have, and the more the coil will act as a straight resistance.

It is apparent that shifting of the second harmonic ripple voltage downwardly can result in a condition where the second harmonic voltage curve becomes tangent to the critical voltage curve and a fixed residual amount of conduction takes place. To prevent this condition, the induced current in winding 16 from saturation effect is used to balance out this residual amount of thyratron conduction current, and effectively no saturation takes place.

It is to be noted that the adjustable capacitor 36 and adjustable resistor 37 which are connected between the cathodes and grids of the thyratrons constitute a vernier adjustment means whereby the shape of the second harmonic ripple wave can be accurately adjusted. In simpler cases the adjustable capacitor 36 and adjustable resistor 37 may be used independently of anything else to control the shape of the second harmonic ripple wave. They are shown adjustable in this disclosure, but they are adjusted only once to suit the particular conditions of the system, and particularly to adjust for the particular type of rectifier unit used. In the production line they will have fixed values, preferably.

Attention is called to Figure 3. In this figure, the anode voltage curve is indicated by the reference character 39 and the current curve by the reference character 40 for one of the thyratrons. The full line shows the particular point for which a certain given adjustment has been made at which the firing of the thyratrons will occur.

The firing of the thyratrons is controlled by the point at which the control grid voltage curve 41 cuts across the critical voltage curve 42. The grid voltage curve is composed of the second harmonic ripple voltage, and the D.C. bias voltage. The D.C. bias voltage determines approximately the center line for the second harmonic ripple voltage. For example, a low value, that is to say, a low negative value of the D.C. bias voltage 43 will cause the ripple second harmonic control voltage to move upwardly towards the zero line 44 in Figure 3, as shown in dotted lines. The D.C. voltage for this adjustment is indicated at 43.

If it is desired to have the thyratrons fire at a later instant in each cycle, the D.C. bias can be varied, and given a larger negative value, that is to say, it can be moved downwardly, as shown at 45 in Figure 3. This shifts the second harmonic ripple voltage curve downwardly as shown in full lines 41.

It is to be noted particularly that the above described second harmonic ripple voltage which is superimposed on the D.C. negative bias voltage is a very desirable and important feature of this invention. It is obvious that if the D.C. bias voltage alone was depended upon, that as it was adjusted downwardly nearer and nearer to the relatively almost flat portion of the critical voltage curve, that it would approach an asymptotic, or at least a tangent line to such critical voltage curve. On the other hand, by using the second harmonic ripple voltage superimposed on the D.C. bias voltage it is apparent from an examination of Figure 3 and from the description given immediately above, that a very sharp point at which firing and cutoff of the thyratrons will occur, is obtained. There is no uncertainty as to when this will occur under these conditions, for the second harmonic ripple voltage cuts across the firing voltage curve or critical voltage curve at sharp and definite places. This results in complete control from effectively zero to full thyratron current.

This exact point of firing may also be controlled very accurately by the vernier control provided by the adjustable condenser 36 and resistor 37 and also by the size of the condenser 21, and by the number of turns shorted out in the two D.C. coils 13 and 16 of the saturable reactor 14.

Figure 2 shows the shell type of core which is the one used for the saturable reactor 14. The central winding on the middle leg of the core of Figure 2 is intended to represent the two D.C. windings 13 and 16.

If desired, a manual control may be provided. In this case the switch 46 is moved to connect the conductor 33 to the conductor 47 and the switch 48 is moved to connect the conductor 49 to the conductor 50. The adjustments of the potentiometer 24 and the rheostat 38 are made manually.

It will be seen that a novel system of regulation has been provided by this invention, and that although extreme accuracy is obtained, and although a great deal of flexibility in control is also obtained, nevertheless, the results are obtained by relatively simple and easily produced apparatus.

It will be seen further that the various adjustments can be most easily made. As stated, if desired, these adjustments may be made only once for the capacitor 36 and the resistor 37, and thereafter fixed values may be used if desired. On the other hand, if it is desired to have these adjustments made for each individual rectifier or to suit the demand of a customer, they can easily be left in an adjustable condition, or in other words, furnished so that the customer can adjust them to suit his particular need.

It will be seen that a novel form of regulation has been obtained by this invention, and that although extreme accuracy is obtained and although a great deal of flexibility in control is also obtained, nevertheless, the results are obtained by relatively simple and easily produced apparatus.

Although two thyratrons have been shown it is obvious that a single thyratron could be employed if so desired. Therefore, the expression "thyratron" as may appear hereinafter is intended to indicate either a single thyratron or a plurality of thyratrons.

Although this invention has been described in considerable detail, it is to be understood that such description is intended as illustrative rather than limiting as this invention may be variously embodied and is to be interpreted as claimed.

I claim:

1. A system of regulation comprising a source of alternating current, a direct current load, a rectifier interposed between said source and said load, a saturable reactor arranged to control the alternating current voltage at said rectifier and having a control winding, a source of current for the control winding, electron discharge means arranged to control the value of the current flow through the control winding, means for supplying a constant direct voltage, means for balancing the constant voltage against the voltage of said load and supplying the difference in voltage as a control voltage to said electron discharge means, said electron discharge means having a critical firing voltage range, and means for supplying a second harmonic ripple with reference to the alternating current to the control voltage for said electron discharge means to cause the control voltage made up of the direct current voltage and the harmonic ripple to pass through the critical characteristic range of the electron discharge device at a precise point.

2. A system of regulation comprising a source of alternating current, a direct current load, a rectifier interposed between said source and said load, a saturable reactor arranged to control the alternating current voltage at the rectifier, a direct current winding on said saturable reactor constituting a control winding, a source of direct current for said control winding, electron discharge means arranged to control the direct current supplied the control winding of said saturable reactor and having a firing characteristic curve, means for securing a constant direct voltage, means for balancing the constant direct voltage against the voltage at the load, and means for generating and supplying a second harmonic ripple with reference to the alternating current to the control voltage for said electron discharge device, whereby the control voltage curve will intersect the firing characteristic curve of said electron discharge device at a precise and sharply defined point.

3. A system of regulation comprising a source of alternating current, a direct current load, a rectifier interposed between said source and said load, control means for controlling the voltage at the rectifier including electron discharge means having a critical firing voltage range, means for supplying a direct current control voltage to said electron discharge device, means for producing a second harmonic ripple with reference to the alternating current, means for supplying the second harmonic ripple to said control voltage, whereby the control voltage will pass into and out of the control firing voltage range at precise points, and a comparison network including a first circuit having a first resistor with a first tapped point and a constant voltage device connected in series, and a second circuit including a second resistor having a second tapped point, said first and second circuits being connected in parallel, and means for adding any difference in voltage that may exist between the first and second tapped points to said control voltage.

4. A system of regulation comprising a source of alternating current, a direct current load, a rectifier interposed between said source and said load, a saturable reactor arranged to control the alternating current voltage at the rectifier, said saturable reactor having a direct current control winding, a source of direct current for said control winding, a thyratron for contolling the current passing through said direct current control winding, said thyratron having a critical firing voltage curve, a source of constant direct current control voltage, means for balancing the constant voltage against a voltage proportional to the voltage at said direct current load and for supplying the resultant voltage to said electron discharge device as a control voltage, and means for superimposing a second harmonic ripple with reference to the alternating current on the control voltage, whereby the curve of the composite control voltage will intersect the critical firing voltage curve of said thyratron at a precise point.

5. A system of regulation comprising a source of alternating current, a direct current load, a rectifier interposed between said source and said load, a saturable reactor arranged to control the alternating current voltage at said rectifier, said saturable reactor having a series control winding through which the current supplied said direct current load passes, and having a second direct current control winding, electron discharge means including a thyratron for controlling the current through said second control winding, said thyratron having a critical firing voltage curve, means for supplying a direct current voltage, means for balancing a voltage proportional to the voltage at the direct current load against the constant voltage to thereby provide a control voltage for said thyratron, means for generating a second harmonic voltage with reference to the alternating current, and means for superimposing the second harmonic voltage upon said control voltage for said thyratron, whereby the resultant control voltage will intersect the firing voltage curve of said thyratron at a precise point.

6. A system of regulation comprising a source of alternating current, a direct current load, a rectifier interposed between said source and said load, a saturable reactor arranged to control the alternating current voltage at said rectifier, said saturable reactor having a series control winding connected in series with said load and having a second control winding, a thyratron, a source of alternating current for said thyratron, said thyratron controlling the current passing through said second control winding of said saturable reactor and having a critical firing voltage curve, said thyratron being supplied with current from said second source of alternating current and furnishing the direct current for said second control winding of said saturable reactor, said rectifier being arranged to produce a second harmonic ripple voltage, a source of reference voltage, means for supplying a direct current control voltage to the thyratron proportional to the difference between the reference voltage and a voltage proportional to the voltage at the load, means for supplying the ripple voltage to the control voltage of the thyratron, and means for controlling the amplitude of the ripple voltage supplied the control voltage of said thyratron.

7. A system of regulation comprising a source of alternating current, a direct current load, a rectifier interposed between said source and said load, a saturable reactor arranged to control the alternating current voltage at said rectifier, said saturable reactor having a series control winding connected in series with said load and having a second control winding, a second source of alternating current, a thyratron supplied with alternating current from said second source and furnishing direct current to said second control winding of said saturable reactor, a source of reference voltage, means for balancing the reference voltage against a voltage proportional to the voltage at said load and supplying the difference in voltage as a direct current control voltage to said thyratron, said rectifier being arranged to produce a second harmonic ripple voltage, means for superimposing the second harmonic ripple voltage on the direct current control voltage of said thyratron, and means for controlling the amplitude of the second harmonic ripple voltage.

8. A system of regulation comprising a source of alternating current, a direct current load, a rectifier interposed between said source and said load, a saturable reactor arranged to control the alternating current voltage at said rectifier, said saturable reactor having a series control winding connected in series with said load and having a second control winding, a second source of alternating current, a thyratron supplied with alternating current from said second source and furnishing direct current to said second control winding of said saturable reactor, a source of reference voltage, means for balancing the reference voltage against a voltage proportional to the voltage at said load and supplying the difference in voltage as a direct current control voltage to said thyratron, said rectifier being arranged to produce a second harmonic ripple voltage, means for superimposing the second harmonic ripple voltage on the direct current control voltage of said thyratron, and means for controlling the phase of said second harmonic ripple voltage.

9. A system of regulation comprising a source of alternating current, a direct current load, a rectifier interposed between said source and said load, a saturable reactor arranged to control the alternating current voltage at said rectifier, said saturable reactor having a series control winding connected in series with said load and having a second control winding, a second source of alternating current, a thyratron supplied with alternating current from said second source and furnishing direct current to said second control winding of said saturable reactor, a source of reference voltage, means for balancing the reference voltage against a voltage proportional to the voltage at said load and supplying the difference in voltage as a direct current control voltage to said thyratron, said rectifier being arranged to produce a second harmonic ripple voltage, means for superimposing the second harmonic ripple voltage on the direct current control voltage of said thyratron, and means for controlling the shape of said second harmonic ripple voltage.

10. A system of regulation comprising a source of alternating current, a direct current load, a rectifier interposed between said source and said load, a saturable reactor arranged to control the alternating current voltage at said rectifier, said saturable reactor having a series control winding connected in series with said load and having a second control winding, a thyratron, a source of alternating current for said thyratron, said thyratron controlling the current passing through said second control winding of said saturable reactor and having a critical firing voltage curve, said thyratron being supplied with current from said second source of alternating current and furnishing the direct current for said second control winding of said saturable reactor, said rectifier being arranged to produce a second harmonic ripple voltage, a comparison circuit unit for producing a reference voltage bearing a predetermined relation to the source voltage at said source of alternating current and varying said relation as said source voltage varies, means for supplying a direct current control voltage to the thyratron proportional to the difference between the reference voltage and a voltage proportional to the voltage at the load, means for supplying the ripple voltage to the control voltage of the thyratron, and means for controlling the amplitude of the ripple voltage supplied the control voltage of said thyratron.

11. A system of regulation comprising a source of alternating current, a direct current load, a rectifier interposed between said source and said load, a saturable reactor arranged to control the alternating current voltage at said rectifier, said saturable reactor having a series control winding connected in series with said load and having a second control winding, a thyratron, a source of alternating current for said thyratron, said thyratron controlling the current passing through said second control winding of said saturable reactor and having a critical firing voltage curve, said thyratron being supplied with current from said second source of alternating current and furnishing the direct current for said second control winding of said saturable reactor, said rectifier being arranged to produce a second harmonic ripple voltage, a comparison circuit unit for producing a reference voltage bearing a predetermined relation to the source voltage at said source of alternating current and varying said relation as said source voltage varies, means for supplying a direct current control voltage to the thyratron proportional to the difference between the reference voltage and a voltage proportional to the voltage at the load, and means for super-imposing the second harmonic voltage upon said control voltage for said thyratron.

References Cited in the file of this patent

UNITED STATES PATENTS

| | | |
|---|---|---|
| 2,079,500 | Foos | May 4, 1937 |
| 2,511,219 | Pogarzelski | June 13, 1950 |
| 2,675,515 | Blashfield | Apr. 13, 1954 |
| 2,766,382 | Dawson | Oct. 9, 1956 |
| 2,771,576 | Meszaros | Nov. 20, 1956 |
| 2,830,250 | Frederick et al. | Apr. 8, 1958 |
| 2,868,896 | Garbor et al. | Jan. 13, 1959 |